(12) United States Patent
Shinotsuka et al.

(10) Patent No.: US 6,301,559 B1
(45) Date of Patent: Oct. 9, 2001

(54) SPEECH RECOGNITION METHOD AND SPEECH RECOGNITION DEVICE

(75) Inventors: Hiroshi Shinotsuka; Noritoshi Hino, both of Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/192,197

(22) Filed: Nov. 16, 1998

(30) Foreign Application Priority Data

Nov. 14, 1997 (JP) .................................................. 9-313673

(51) Int. Cl.[7] .................................................. G10L 15/14
(52) U.S. Cl. ............................................ 704/239; 704/255
(58) Field of Search .................................. 704/233, 253, 704/254, 251, 200, 200.1, 231, 256, 255, 239, 240

(56) References Cited

U.S. PATENT DOCUMENTS 5,764,852 * 6/1998 Williams .............................. 704/243

FOREIGN PATENT DOCUMENTS 5-066790   3/1993 (JP) .

* cited by examiner

*Primary Examiner*—Richemond Dorvil
(74) *Attorney, Agent, or Firm*—Venable; Robert J. Frank; Allen Wood (57) ABSTRACT

To realize a speech recognition method and speech recognition device that reduce erroneous recognition for words that are not to be recognized and ambient sounds, and to improve the recognition capability, characteristic parameters of words to be recognized and characteristic parameters of words that are not to be recognized and ambient sounds are previously entered in a vocabulary template 40. Degrees of similarity are obtained in a speech recognition section 30 between characteristic parameters for input words (or sounds) and all the characteristic parameters stored in the vocabulary template 40. Information indicating one characteristic parameter, from among the characteristic parameters stored in the vocabulary template 40, that is the closest approximation to the characteristic parameter of the input word (or sound), is generated as a recognition result.

20 Claims, 8 Drawing Sheets

| ADDRESS | STORED DATA |
|---|---|
| 0000 | CHARACTERISTIC PARAMETER OF "AIR CONDITIONER" |
| 0001 | CHARACTERISTIC PARAMETER OF "WINDOW" |
| 0002 | CHARACTERISTIC PARAMETER OF "ON" |
| 0003 | CHARACTERISTIC PARAMETER OF "OPEN" |
| ⋮ | ⋮ |
| FFFD | CHARACTERISTIC PARAMETER OF "SAN" |
| FFFE | CHARACTERISTIC PARAMETER OF THE SOUND OF A DOOR BEING OPENED OR CLOSED |
| FFFF | CHARACTERISTIC PARAMETER OF THE SOUND OF AN AIR CONDITIONER OPERATING |

| ADDRESS | STORED DATA |
|---|---|
| 0000 | SPEECH CODE CORRESPONDING TO "AIR CONDITIONER" |
| 0001 | SPEECH CODE CORRESPONDING TO "WINDOW" |
| 0002 | SPEECH CODE CORRESPONDING TO "ON" |
| 0003 | SPEECH CODE CORRESPONDING TO "OPEN" |
| ⋮ | ⋮ |
| FFFD | SPEECH CODE CORRESPONDING TO "SAN" |
| FFFE | SPEECH CODE CORRESPONDING TO THE SOUND OF A DOOR BEING OPENED OR CLOSED |
| FFFF | SPEECH CODE CORRESPONDING TO THE SOUND OF AN AIR CONDITIONER OPERATING |

SPEECH RECOGNITION METHOD AND SPEECH RECOGNITION DEVICE

BACKGROUND OF THE INVENTION

1. Field of the invention

The present invention relates to a speaker independent speech recognition method and speech recognition device, and particularly relates to a speech recognition method and speech recognition device that improve the recognizing capability for single words using a template matching system.

2. Description of the Related Art

Recently, speech recognition technology has been utilized in various fields. For example, operational control of mechanisms maintained inside a vehicle when the vehicle is traveling is carried out using sound. More specifically, operation of audio devices, an air conditioner etc., opening and closing of a window, switching on or off a light inside the vehicle, is carried out using sound. In this type of situation, it is required to reliably execute the operation of each device by correctly recognizing a sound spoken by the driver, being any unspecified speaker.

As a speech recognition system for this situation, there are various systems, one of which is the template matching system. The template matching system has a vocabulary template in which characteristic parameters for specific sounds to be recognized, for example a plurality of words, are entered in advance (stored). In a template matching system, a characteristic parameter is educed from a word spoken by an unspecified speaker, and degrees of similarity between this educed characteristic parameter and the characteristic parameters of each word entered in the vocabulary template are compared. Using this comparison, a word corresponding to a characteristic parameter among the characteristic parameters stored in the vocabulary template that is the closest approximation to the characteristic parameter of the sound spoken by the unspecified speaker is confirmed as the word spoken by the unspecified speaker. The speech waveform, frequency spectrum etc. of each word may be used as the characteristic parameter.

[Problems to be Solved by the Invention]

However, in a speech recognition method using the above described template matching system, there are the following problems.

For example, when an unspecified speaker utters, as a sound, a word that is not a word to be recognized as it is different from the specified sounds (a word that does not have a characteristic parameter entered in advance in the vocabulary template), in the above described speech recognition method, a word that is the closest approximation to the characteristic parameter of the word that is not to be recognized (one word that has a characteristic parameter entered in the vocabulary template) is erroneously recognized as the word spoken. This type of problem is particularly significant with words that are similar to specific sounds (words) to be recognized.

Also, this type of erroneous recognition is not limited to speech, but is also caused by ambient sounds that occur suddenly. In the above described speech recognition within a vehicle, ambient sounds that occur suddenly are, for example, the sound of a door opening or closing, the sound of an air conditioner operating, the sound of wind across a window while the vehicle is traveling, or the sound of tires when passing over seams or a center line etc. of a road. With these sounds as well, if the speech recognition system operates, a sound will be erroneously recognized as the word, among the words having characteristic parameters stored in the vocabulary template, having the closest approximation to the sound.

In dealing with this type of erroneous recognition, it is also preferably implemented by making the speech recognition device as large as possible, preventing increase in cost and without major changes to a conventional speech recognition device.

In order to solve the above problems, the object of the present invention is to realize a speech recognition method that limits erroneous recognition for sounds that are different from specific sounds to be recognized (for example, ambient sounds and words that are not to be recognized), and has improved recognition capability.

A further object of the present invention is to achieve the above object by making the speech recognition device as large as possible, preventing increase in cost and without major changes to a conventional speech recognition device.

SUMMARY OF THE INVENTION

In order to achieve the above described objects, a speech recognition method of the present invention has a vocabulary template with characteristic parameters for a plurality of sounds previously entered, for carrying out speech recognition for a speech that has been input using the vocabulary template, and comprises the steps of: previously entering characteristic parameters for a plurality of specific sounds to be recognized, and characteristic parameters for sounds different to the specific sounds, into the dictionary; detecting characteristic parameters from an input speech; and obtaining degrees of similarity between characteristics parameters of a detected speech and respective characteristic parameters entered in the vocabulary template, and outputting information indicating one parameter among the characteristic parameters entered in the dictionary that approximates to the educed speech as a result.

In order to achieve the above described object, a speech recognition device of the present invention for carrying out speech recognition using degrees of similarity between characteristic parameters for a plurality of previously entered speeches and characteristic parameters for input speeches, comprises: a characteristic parameter storage circuit for previously storing characteristic parameters for a plurality of specific sounds to be recognized, and characteristic parameters for sounds different to the specific sounds; a characteristic parameter educing circuit for educing characteristic parameters for input sounds; a degree of similarity comparison circuit for obtaining degrees of similarity between characteristics parameters of an educed speech and respective characteristic parameters entered in the characteristic parameter storage circuit; and a comparison result outputting circuit for outputting information indicating one degree of similarity obtained by the degree of similarity comparison circuit that approximates to the speech that has been educed among characteristic parameters stored in the characteristic parameter storage circuit.

DETAILED DESCRIPTION OF THE PREFERRED EMBODIMENTS

The speech recognition method and speech recognition device of the present invention will be described in detail below, using the drawings.

Figure 1:
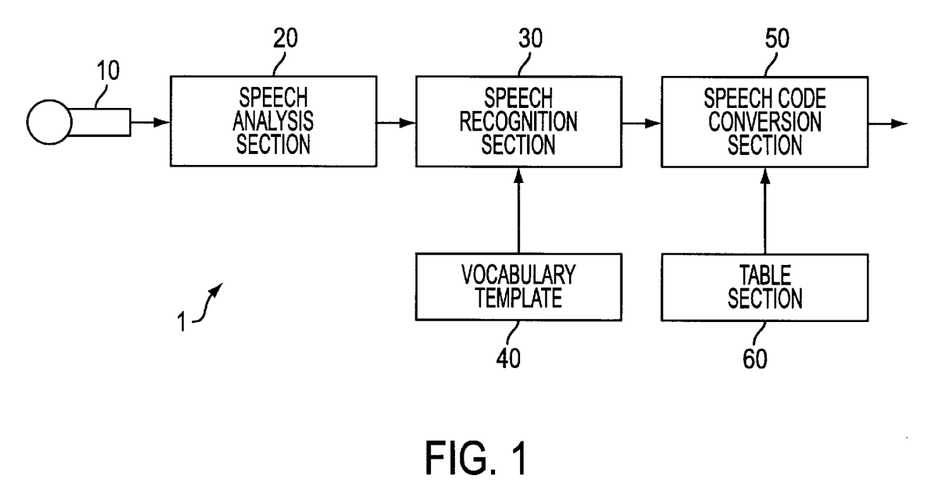
FIG. 1 is a schematic block diagram of a speech recognition device 1 of an embodiment of the present invention.

FIG. 1 is a schematic block diagram showing one structural example of a speech recognition device 1 of an embodiment of the present invention. 10 is a microphone, 20 is a speech analysis section, 30 is a speech recognition section, 40 is a vocabulary template, 50 is a speech code conversion section, and 60 is a table section. Generally, speech recognition is carried out using the speech recognition section 30 and the vocabulary template 40. Accordingly, the microphone 10, speech analysis section 20, speech code conversion section 50 and table section 60 can be arranged as external devices of the speech recognition device 1. In this embodiment, the speech recognition device has the structure shown in FIG. 1.

The microphone 10 receives a sound uttered by an unspecified speaker and sends it to the speech analysis section 20 as analog speech data.

The speech analysis section 20 converts analog speech data sent from the microphone 10 into digital speech data.

The vocabulary template 40 is composed of memory, and has characteristic parameters of a plurality of specific sounds to be recognized in the speech recognition device 1, words to be recognized in this embodiment, previously entered (stored) therein. Characteristic parameters for words that are different from the specific sounds and which are not to be recognized, particularly words that are similar to words be recognized (words having characteristic parameters entered in the vocabulary template 40), and characteristic parameters of ambient sounds, are also previously entered into the vocabulary template 40 of the present invention. In this way, the vocabulary template 40 functions as a characteristic parameter storage circuit.

The speech recognition section 30 educes characteristic parameters from the digital audio data sent from the speech analysis section 20, and compares degrees of similarity between these educed characteristic parameters and the plurality of characteristic parameters that are entered in the vocabulary template 40. The speech recognition section 30 also outputs the result of comparison of degrees of similarity, and information indicating one characteristic parameter, among the characteristic parameters entered in the vocabulary template 40, that has the closest proximity to the educed characteristic parameter of the speech input from the microphone 10. In this way, the speech recognition section 30 functions as a characteristic parameter educing circuit, a degree of similarity comparison circuit, and a comparison result output circuit.

The table section 60 is a table for converting information output from the speech recognition section 30 into speech codes, and is composed of memory. That is, the table section 60 functions as a speech code table.

The speech conversion section 50 outputs a preferred speech code from information output from the speech recognition section 30 by referring to the table section 60. A controller controls the operation of devices such as a window or an air conditioner, inside a vehicle, and the speech code is actually digital data for causing execution of a command in processing internal to this controller (operation processing such as switching an air conditioner on, closing a window, etc.), in response to a speech.

Figure 2:
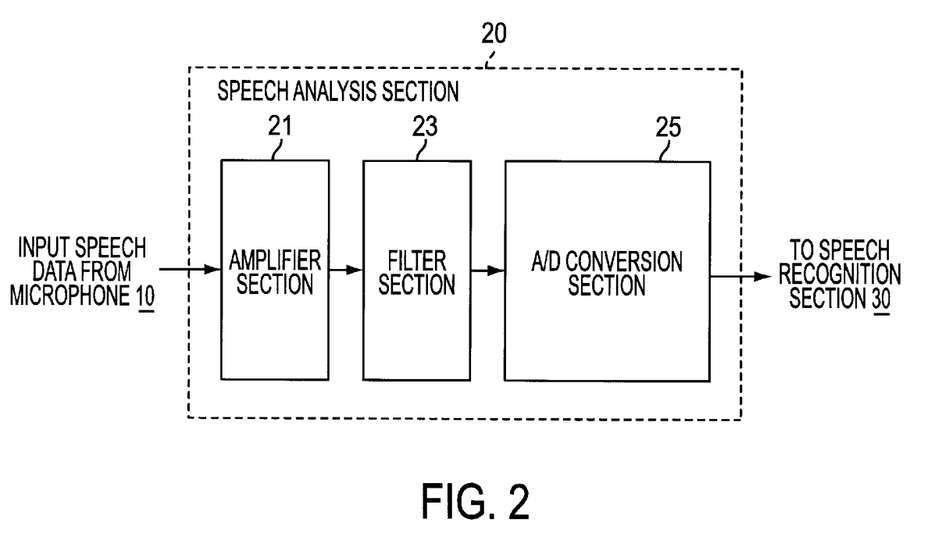
FIG. 2 is a schematic block diagram of a speech analysis section 20 of the embodiment of the present invention.

A detailed description of the speech analysis section 20 will now be given using the drawings. FIG. 2 is a schematic block diagram showing one structural example of the speech analysis section 20.

As shown in FIG. 2, the speech analysis section 20 comprises an input speech amplifier section 21, a filter section 23, and an analog/digital converter section 25.

The input speech amplifier section 21 receives analog speech data sent from the microphone 10, and amplifies the signal amplitude of the analog speech data that has been received. Even if the level of the speech received at the microphone 10 is small, the signal amplitude of the speech is amplified by the input speech amplifier section 21, which means that processing carried out by the analog/digital converter section 25 can be executed more accurately. The filter section 23 is a band pass filter for removing a specific band, for instance, a band equivalent to a noise component, from the analog speech data that has been subjected to amplification processing in the input speech amplifier section 21. The analog/digital converter section 25 converts analog data that has passed through the filter section 23 into digital speech data so that it can be subjected to digital processing in the speech recognition section 30 at a subsequent stage. This digital speech data constitutes the output of the speech analysis section 20.

Figure 3:
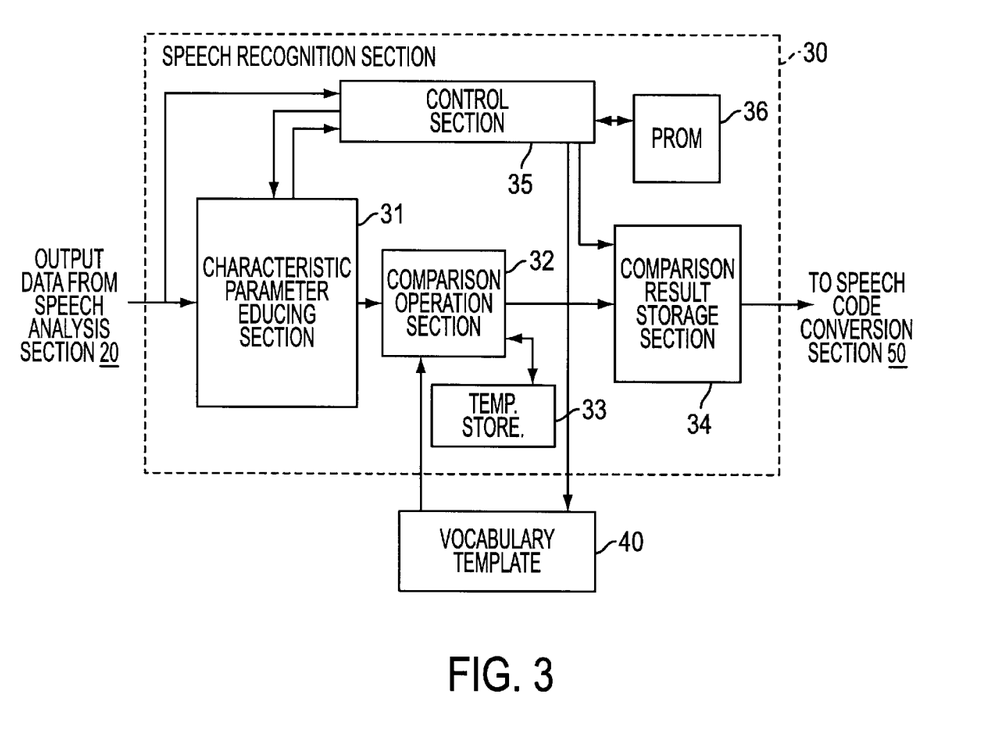
FIG. 3 is a schematic block diagram of a speech recognition section 30 of the embodiment of the present invention.

The speech recognition section 30 will be described in detail below, using the drawings. FIG. 3 is a schematic block diagram showing one structural example of the speech recognition section 30.

In FIG. 3, the speech recognition section 30 comprises a characteristic parameter educing section 31, a comparison operation section 32, a temporary storage section 33, a comparison result storage section 34, a control section 35, and a programmable read only memory (hereinafter called PROM) 36.

The characteristic parameter educing section 31 educes a characteristic parameter from digital speech data that has been output from the speech analysis section 20. As has been described above, this characteristic parameter is a speech waveform, frequency spectrum, etc. corresponding to the digital speech data. The characteristic parameter educing section 31 thus functions as a characteristic parameter educing circuit.

The comparison operation section 32 compares the characteristic parameter educed in the characteristic parameter educing section 31 and the characteristic parameters entered in the vocabulary template 40, and obtains degrees of similarity.

More specifically, the comparison operation section 32 initially reads out one characteristic parameter from the vocabulary template 40, and obtains a degree of similarity between that characteristic parameter and the characteristic parameter educed in the characteristic parameter educing section 31. Of the obtained degree of similarity and a previously prepared degree of similarity for initial comparison, information (indicating the word it corresponds to, etc.) of a characteristic parameter that is judged to be most similar to the characteristic parameter output from the characteristic parameter educing section 31, and the degree of similarity, are temporarily stored in the temporary storage section 33. The previously prepared degree of similarity for initial comparison preferably has a value such that a characteristic parameter read out from the vocabulary template 40 is always stored in the temporary storage section 33. In this embodiment, the degree of similarity for initial comparison has been prepared, but it is also possible to store a degree of similarity of one characteristic parameter initially read out from the vocabulary template 40 without comparing the degree of similarity, instead of preparing a degree of similarity for initial comparison. It is also possible to read out two characteristic parameters from the vocabulary template 40, compare the degrees of similarity of these two characteristic parameters, and store the degree of similarity that is the closest approximation to the output from the characteristic parameter educing section 31 in the temporary storage section 33.

Next, another characteristic parameter is read out from the vocabulary template 40 and a degree of similarity is obtained. This obtained degree of similarity and the degree of similarity that has been stored in the temporary storage section 33 are compared, and information of the characteristic that is judged to be most similar to the characteristic parameter output from the characteristic parameter educing section 31, and the degree of similarity itself, are stored in the temporary storage section 33. Processing is carried out in this way for all characteristic parameters entered in the vocabulary template 40. That is, after degrees of similarity have been compared for all characteristic parameters entered in the vocabulary template 40, the information for the one remaining characteristic parameter, for example, the characteristic parameter finally stored in the temporary storage section 33, constitutes the output of the comparison operation section 32. The temporary storage section 33 in FIG. 3 can be provided within the comparison operation section 32. If the comparison operation section 32 can be provided within the temporary storage section 33 it is better from the point of view of miniaturization of the speech recognition device 1, reduction of costs and increase in processing speed. In this way, the comparison operation section 32 has the function of a degree of similarity comparison circuit.

The comparison result storage section 34 temporarily stores, and then outputs, the information output from the comparison operation section 32. This output constitutes the output of the speech recognition section 30. In this way, the comparison result storage section 34 functions as a comparison result output circuit. In this embodiment, the comparison result storage section 34 is provided so that degree of similarity comparison processing can be carried out for characteristic parameters of a sound newly input from the microphone 10 after the comparison operation section 32 has completed degree of similarity comparison processing for characteristic parameters of a specific input sound. Providing the comparison result storage section 34 is intended to have the effect that the speech recognition device 1 can recognize consecutive words at a high speed. Even if the comparison result storage section 34 is not provided, the information output from the comparison operation section 32 can be utilized as the output of the speech recognition section 30. In this case, the speech recognition device 1 can be reduced in size and reduced in cost by the extent of the comparison result storage section 34.

The control section 35 controls the operation of the characteristic parameter educing section 31, the comparison operation section 32, the comparison result storage section 34 and the vocabulary template 40, and outputs control signals for controlling the operation of each of these sections. The control signal output operation of the control section 35 is started in this embodiment by the control section 35 receiving output from the speech analysis section 20. Control signals output from the control section 35 are output so as to control the operation of each section at an appropriate timing based on a program stored in the PROM 36.

For example, for the characteristic parameter educing section 31, the control section 35 outputs control signals instructing the start and completion of characteristic parameter educing processing for output from the speech analysis section 20. Also, for the comparison operation section 32 control signals are output instructing the start and completion of processing for obtaining degrees of similarity between output from the characteristic parameter educing section 31 and output from the vocabulary template 40. For the vocabulary template 40, the control section 35 outputs control signals instructing read out of a stored characteristic parameter. For the comparison result storage section 34, control signals are output instructing storage of the output from the comparison operation section 32. If the characteristic parameter educing section 31 and the comparison operation section 32 are activated and kept in a state where processing is usually possible whenever the operating power supply of the speech recognition device 1 is turned on, then it can be considered that there will be cases where among the control signals output from the control section 35, the signals instructing start and completion for the characteristic parameter educing section 31 and the comparison operation section 32 are not particularly necessary. Therefore, if the operation of the characteristic parameter educing section 31 and the comparison operation section 32 are controlled by this type of control signal, it is possible to operate each of the sections constituting the speech recognition section 30 at an appropriate timing, and to suppress power consumption, which is obviously advantageous.

Figure 4:
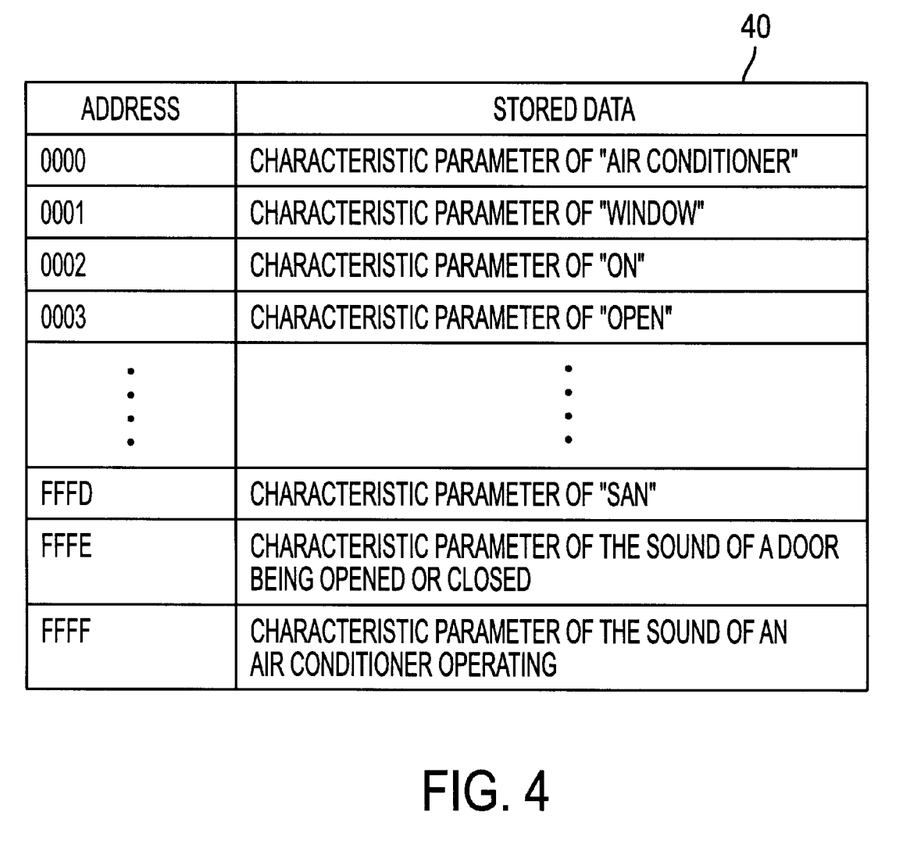
FIG. 4 is a diagram showing the stored content of a vocabulary template 40 in the embodiment of the present invention.

The stored contents of the vocabulary template 40 will be described based on the drawings. FIG. 4 is a drawing showing the stored contents of the vocabulary template 40.

In the vocabulary template 40, a plurality of characteristic parameters are stored corresponding to addresses. In FIG. 4, respective characteristic parameters are stored at addresses 0000H–FFFFH (H indicates that the number is a hexadecimal number). For example, the characteristic parameter of "air conditioner", which is a phrase to be recognized, is stored at address 0000H. The characteristic parameter for "window", being a word to be recognized, is stored at address 0001H. The characteristic parameter for "on", being a word to be recognized, is stored at address 0002H. The characteristic parameter for "open", being a word to be recognized, is stored at address 0003H. Similarly, characteristic parameters for a necessary number of words to be recognized are respectively stored so as to be readable from specific addresses. These type of sounds to be recognized are defined as specific sounds.

As well as characteristic parameters of words to be recognized, there are also characteristic parameters of words that are not to be recognized, for example, words that are similar to the words to be recognized, or ambient sounds, stored in the vocabulary template 40. For example, in FIG. 4, the characteristic parameter of the word "san" (an honorific in the Japanese language that can be translated as "Mr.") is stored at address FFFDH of an area for sounds that are not primarily sounds to be recognized, as a word that is similar to "on" that is to be recognized. Also, the characteristic parameter of the sound of a door opening or closing is stored at address FFFEH of an area for sounds that are not primarily sounds to be recognized, as an ambient sound. The characteristic parameter of the sound of an air conditioner operating is stored at address FFFFH of an area for sounds that are not primarily sounds to be recognized, as an ambient sound. These type of words similar to words to be recognized, and ambient sounds, are defined as sounds that are different from specific sounds. In this definition, it goes without saying that as well as the similar words and ambient sounds, any sounds that are different from the specific sounds that are to be recognized can also be included.

The vocabulary template 40 has a region for storing characteristic parameters of specific sounds that are sounds to be recognized, and a region for storing characteristic parameters of sounds that are different from the specific sounds, such as words that are similar to words to be recognized and ambient sounds.

In FIG. 4, the characteristic parameters of words that are similar to words to be recognized and the characteristic parameters of ambient sounds are both stored together, but depending on the circumstances in which the speech recognition device 1 is used, it is possible to store only either the characteristic parameters of the words that are similar to sounds to be recognized or the characteristic parameters of ambient sounds. For example, if the speech recognition device 1 is used in a situation where ambient sounds are hardly any problem because the place is quiet, then it is sufficient to store characteristic parameters of sounds that are to be recognized and characteristic parameters of words that are similar to the sounds to be recognized, in the vocabulary template 40. Similarly, if the speech recognition device 1 is to be used in a situation where there is hardly any problem with similar words, such as when there are hardly any words similar to the sounds to be recognized, it is sufficient to store characteristic parameters of the sounds to be recognized and characteristic parameters of ambient sounds in the vocabulary template 40.

In this way, depending on the circumstances in which the speech recognition device 1 is used, by storing one of either the characteristic parameters of words that are similar to sounds to be recognized, or the characteristic parameters of ambient sounds, the capacity of the memory constituting the vocabulary template 40 can be made small. In this case, the size of the vocabulary template 40 can be made small, and the characteristic parameters that are the subject of comparison processing by the speech recognition section 30 can be made the minimum necessary. Accordingly, it is possible to miniaturize the speech recognition device 1, reduce the cost and increase the processing speed.

By storing characteristics parameters of both words that are similar to sounds to be recognized and ambient sounds in the vocabulary template 40, the ability to prevent erroneous recognition can be improved.

In FIG. 4, the vocabulary template 40 sequentially stores characteristic parameters of sounds to be recognized from the lower address in a region for storing characteristic parameters of sounds to be recognized, and sequentially stores characteristic parameters of sounds that are not to be recognized and characteristic parameters of ambient sounds in a region for storing characteristic parameters of sounds that are not to be recognized and characteristic parameters of ambient sounds, from an address continuing from the last address of the region for storing characteristic parameters of sounds to be recognized. If speech recognition processing is carried out by the speech recognition section 30 for all characteristic parameters stored in the vocabulary template 40, there is no need to divide the addresses in the above described manner. By dividing the addresses into regions as described above, it is easier to carry out rewriting of characteristic parameters stored in the vocabulary template 40.

Figure 5:
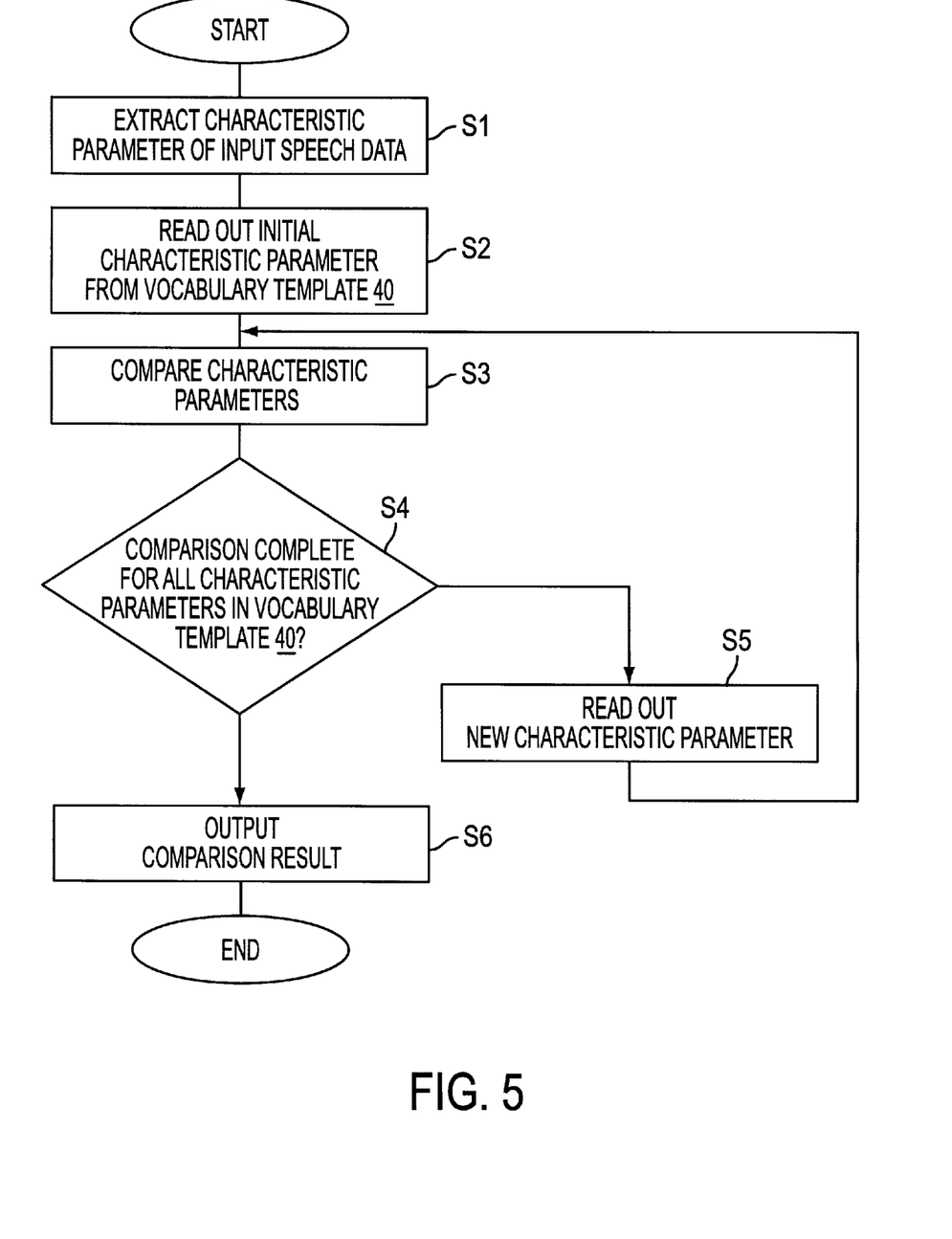
FIG. 5 is a flowchart showing the operation of the speech recognition section 30 of the embodiment of the present invention.

The operation of the speech recognition section 30 having the above described construction will now be described using the drawings. FIG. 5 is a flowchart for describing the operation of the speech recognition section 30.

First of all, in step S1, the speech recognition section 30 receives digital sound data sent as output from the speech analysis section 20 into the characteristic parameter educing section 31. This taking in of data is carried out by the control section 35 receiving an output from the speech analysis section 20 and then sending a control signal from the control section 35 instructing the characteristic parameter educing section 31 to start operation. The characteristic parameter educing section 31 carries out processing to educe a characteristic parameter from the received digital sound data. After completion of the characteristic parameter educing processing, the characteristic parameter educing section 31 sends a signal indicating completion of educing processing to the control section 35.

Next, in step S2 of FIG. 5, the control section 35 sends a control signal instructing operation completion to the characteristic parameter educing section 31, and also sends a signal instructing start of operation to the comparison operation section 32 and a control signal instructing characteristic parameter readout to the vocabulary template 40. When the characteristic parameter is read out from the vocabulary template 40 the control section 35 can also send a signal instructing read and address data for address 0000H.

Next, in step S3 of FIG. 5, the comparison operation section 32 receives the characteristic parameter for "air conditioner" at address 0000H output from the vocabulary template 40, and obtains a degree of similarity between the characteristic parameter output from the characteristic parameter educing section 31 and the characteristic parameter for "air conditioner". The obtained degree of similarity and a degree of similarity for initial comparison are compared, and as a result of this comparison, information relating to the characteristic parameter judged as being the closest approximation to the output from the characteristic parameter educing section 31 (for example, the address) and the obtained degree of similarity are stored. Reading of information from the temporary storage section 33 is preferably carried out by the comparison operation section 32 adopting a control signal instructing comparison operation start received from the control section 35 as a read signal for the temporary storage section 33, and writing of information into the temporary storage section 33 is carried out by adopting a signal indicating completion degree of similarity processing by the comparison operation section 32, and which is to be sent to the control section 35, as a write signal for the temporary storage section 33. If the first characteristic parameter comparison is completed, the comparison operation section 32 send a signal indicating that to the control section 35.

Next, in step S4 of FIG. 5, the control section 35 decides whether or not comparison processing in the comparison operation section 32 has been completed for all characteristic parameters stored in the vocabulary template 40. This decision is carried out by providing a counter in the control section 35 that updates the count value once every time comparison processing is started by the comparison operation section 32 and the vocabulary template 40 is read, and judging whether or not the count value has reached a specified value (in this embodiment a count value equal to FFFFH). Specifically, if the count value of the counter has not reached FFFFH, processing continues to step S5, while if the count value has reached FFFFH processing continues to step S6.

When processing continues to step S5, the control section 35 instructs reading of the characteristic parameter for "window" at address 0001H, which is the next characteristic parameter from the vocabulary template 40, and again sends a signal instructing start of comparison processing to the comparison operation section 32. In this way, the degree of similarity comparison operation of step S3 is carried out between the information stored in the temporary storage section 33 and the characteristic parameter of "window" that has been newly output from the vocabulary template 40.

If processing continues to step S6, the control section 35 sends a control signal instructing completion of the degree of similarity comparison processing to the comparison operation section 32, and the comparison result storage section 34 stores the output from the comparison operation section 32 (specifically, the result of the degree of similarity comparison, which is information of a sound having a characteristic parameter, among the characteristic parameters stored in the vocabulary template 40, that is the closest approximation to the characteristic parameter educed in the characteristic parameter educing section 31). In this embodiment, an example of information output from the comparison operation section 32 is the address. Specifically, if the characteristic parameter of the "on" is chosen, the result of degree of similarity comparison which is the output from the comparison operation section 32, is data indicating the address 0000H.

The processing of step S4, which is processing using a counter, can be carried out within the comparison operation section 32. In this case, one control signal instructing start of degree of similarity processing from the control section 35, and one signal instructing completion of degree of similarity processing from the comparison operation section 32, are respectively output. This is intended to further increase the speed of speech recognition processing of the speech recognition device 1.

In the present invention, as has been described above, characteristic parameters of sounds that are not to be recognized, such as "san", the sound of a door opening or closing, the sound of an air conditioner operating, etc., are also stored in the vocabulary template 40. In the above described steps S2–S5, degree of similarity comparison processing is also carried out for characteristic parameters of these sounds. For example, when the speech recognition device 1 carries out degree of similarity comparison processing for an unspecified speaker mistakenly saying "san", then among the characteristic parameters stored in the vocabulary template 40, the degree of similarity of the characteristic parameter of "san" is a closer approximation than the degree of similarity of the characteristic parameter of "on", which is a similar word, and so "san" is selected. As a result, even if the speech recognition device 1 carries out degree of similarity comparison processing for "san" being spoken, it will not be erroneously judged as being "on". Similarly, even if the speech recognition device 1 carries out degree of similarity comparison processing using sounds such as the sound of a door opening or closing, or the sound of an air conditioner operating, they will not be mistakenly judged as being any of the sounds to be recognized.

As has been described above, it is possible to reduce erroneous recognition in the speech recognition processing of the speech recognition device 1 of the present invention, and to improve the recognition capability. In the above described embodiment, characteristic parameters of sounds that are not originally to be recognized are additionally stored in the vocabulary template 40, and degree of similarity comparison processing is also carried out for these characteristic parameters. This means that the structure of the speech recognition device 1 does not require any significant modifications to the circuit structure or the addition of special circuit components in order to achieve the above described improvements in recognition capability. Accordingly, the speech recognition device 1 can be reduced in size and can realize an improved recognition capability without increasing the cost and without significant changes to a conventional speech recognition device.

Figure 6:
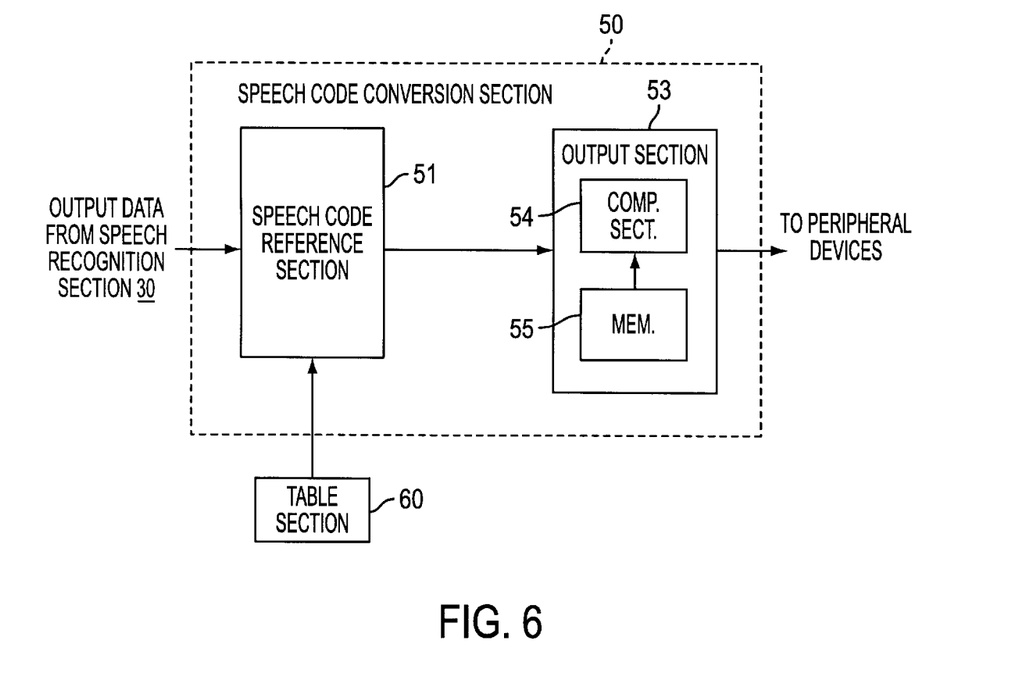
FIG. 6 is a schematic block diagram of a speech code conversion section 50 of the embodiment of the present invention.

The speech code conversion section 50 for carrying out processing on the output from the speech recognition section 30 of the speech recognition device 1 of the embodiment of the present invention will be described below using the drawings. FIG. 6 is a schematic block diagram showing the structure of the speech code conversion section 50.

In FIG. 6, the speech code conversion section 50 is comprised of a speech code reference section 51 and an output decision section 53. The speech code reference section 51 receives recognition result information (the address in the above described case) that is output from the speech recognition section 30, and converts this information to speech codes, being data that can be recognized as representing a specific word in an external device arranged at a subsequent stage to the speech recognition device 1, such as a controller (data that can be processed in a controller operation). The speech code reference section 51 outputs speech codes corresponding to output from the speech recognition section 30. In this way, the speech code reference section 51 functions as a detection section for detecting speech codes. The table section 60 is used in this conversion.

Figure 7:
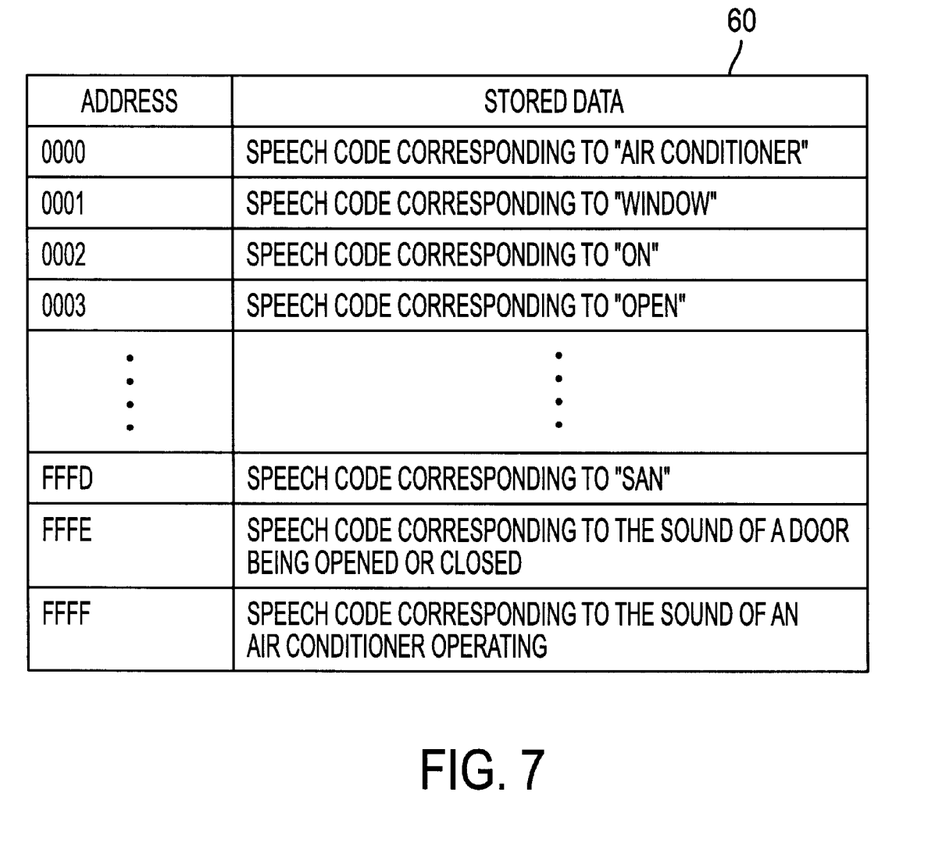
FIG. 7 is a diagram showing the stored content of a table section 60 in the embodiment of the present invention.

The stored contents of the table section 60 will be described using FIG. 7. In FIG. 7 a plurality of speech codes corresponding to addresses are stored in the table section 60. In FIG. 7, respective speech codes are stored at addresses 0000H–FFFFH (H indicates that the number is a hexadecimal number). For example, the speech code corresponding to "air conditioner", which is a phrase to be recognized, is stored at address 0000H. The speech code corresponding to "window", being a word to be recognized, is stored at address 0001H. The speech code corresponding to "on", being a word to be recognized, is stored at address 0002H. The speech code corresponding to "open", being a word to be recognized, is stored at address 0003H. The speech code corresponding to "san" which is not a word to be recognized, is stored at address FFFDH. The speech code corresponding to the sound of a door opening or closing, which is not a word to be recognized, is stored at address FFFEH. The speech code corresponding to the sound of an air conditioner operating, which is not a word to be recognized, is stored at address FFFFH. Similarly, speech codes for a necessary number of words to be recognized are respectively stored at specific addresses so as to be readable.

The addresses at which speech codes are stored in the table section 60 correspond to the addresses at which characteristic parameters are stored in the vocabulary template 40. Specifically, the address in the vocabulary template 40 of the characteristic parameter for the word "on" is the same address, 0003H, as the address in the table section 60 of the speech code for the word "on". By allocating addresses in this way, output from the speech recognition section 30 can be easily converted to speech codes by the speech code conversion section 50 that receives the output as addresses.

The speech codes are, for example, digital data, and all speech codes stored in the table section 60 in the embodiment have unique values.

The output decision section 53 receives output from the speech code reference section 51. The output decision section 53 has a comparison section 54 and memory 55. Speech codes of sounds that are not to be recognized are stored in the memory 55. For example, in FIG. 7, a speech code corresponding to "san", which is a similar word to a word to be recognized, and speech codes corresponding to ambient sounds such as the sound of a door opening or closing, the sound of an air conditioner operating, etc., are stored. The comparison section 54 respectively compares output from the speech code reference section 51 and all of the speech codes stored in the memory 55. As a result of the comparison, if there is no match, namely, when it has been judged that the speech code output from the speech code reference section 51 is a sound (word) to be recognized, the output of the speech code reference section 51 is directly output as the output of the speech code conversion section 50 through the output decision section 53. If there is a match as a result of the comparison, namely, when the speech code output from the speech code reference section 51 is judged to be a sound (word) that is not to be recognized, the output from the speech code reference section 51 is prevented from being output from the speech code conversion section 50. Specifically, the output decision section 53 functions as a decision section for judging the speech code.

The output of the speech code reference section 51 can also be output as the output of the speech code conversion section 50 without providing the output decision section 53. In this case an external device at a subsequent stage to the speech recognition device 1 must determine whether or not the received speech is required. If the output decision section 53 is provided it is possible to use an external device arranged at a subsequent stage to the speech recognition device 1 directly in the conventional manner.

In the above describe embodiment, the case has been described where all of the speech codes that are stored in the table section 60 are different, but the sounds that are not to be recognized can have common speech codes. If this is done, the memory 55 can be a register storing a single speech code, and comparison processing of the comparison section 54 can be completed in a single step. As a result, the speech recognition device 1 is reduced in size as a large-capacity memory 55 is unnecessary, so the cost can be reduced and recognition processing speed can be increased.

The speech recognition device 1 of the present invention has been described in detail above, but the speech recognition device 1 of the present invention is not limited to the above described embodiment.

For example, in the above described embodiment, the sound of a door opening or closing and the sound of an air conditioner operating, etc. have been given as examples of sounds that are not to be recognized, and the characteristic parameters of these sounds are respectively prepared in the vocabulary template 40. However, a case where all of these characteristic parameters are not necessarily prepared will be described below.

As a result of research by the inventors, it has been discovered that impact noises, for example, the sound generated when a microphone is hit when the microphone bumps into something else, the sound when a door closes, the sound when a table is hit, the sound of hands clapping, the sound of books, chairs, etc. being dropped (hereinafter these sounds will be referred to as mechanical vibration noises) have the same frequency spectrum distribution that has a single characteristic parameter.

Figure 8A:
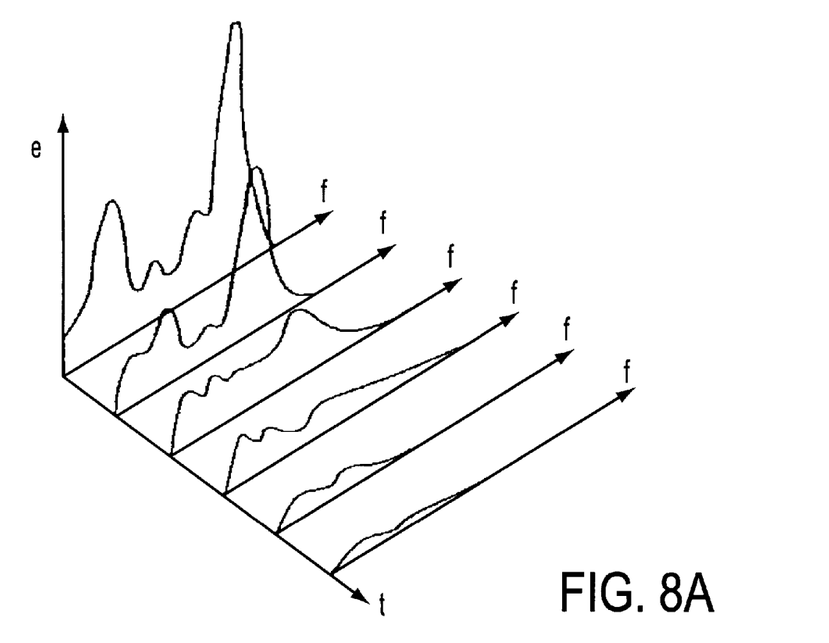
FIG. 8(a) is a drawing showing a high frequency spectrum for mechanical vibration noises in the embodiment of the present invention.
Figure 8B:
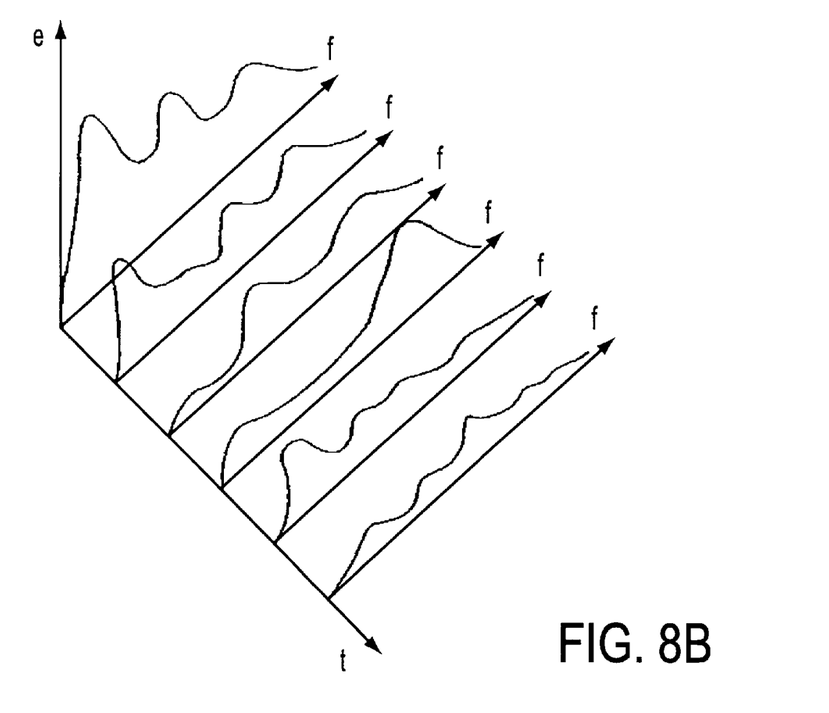
FIG. 8(b) is a drawing showing a high frequency spectrum for speech sounds in the embodiment of the present invention.

FIG. 8 is a drawing showing periodic variation in frequency spectrum of mechanical vibration noises and speech. FIG. 8(a) shows mechanical vibration speech and FIG. 8(b) shows speech. In FIG. 8(a) and FIG. 8(b), the t axis is time, the f axis is frequency and the e axis is energy. The time axis represents time passing in the direction of the arrow, the frequency axis represents change from low frequency to high frequency in the direction of the arrow, and the energy axis represents increase in energy in the direction of the arrow. As shown in FIG. 8(a), the mechanical vibration noise has a A particularly high energy distribution for the high frequency component the instant the noise occurs, but as time t passes (moving in the direction of the arrow representing the time axis), the energy of the high frequency attenuates rapidly. On the contrary, as shown in FIG. 8(b), the energy distribution of the speech sounds is randomly spread for high frequency components and low frequency components with change in time, and not just at the time the sound occurs (that is, there is no attenuation of the high frequency components).

For this reason, mechanical vibration noises are not related to this category (noise occurring when bumping into a microphone, the noise when a table is hit, or when things are dropped, etc.), and cause the rapid attenuation of the high frequency component shown in FIG. 8(a). If a characteristic parameter like that shown in FIG. 8(a) is previously stored in the vocabulary template 40, it becomes possible to store a single characteristic parameter for a plurality of sounds, particularly the above described mechanical vibration noises. Therefore, since the number of characteristic parameters stored in the vocabulary template 40 is reduced, the vocabulary template 40 itself can be reduced in size, and also, since the number of characteristic parameters stored in the vocabulary template 40 can be reduced, the number of items subjected to comparison processing can be reduced. As a result, as a speech recognition method, the recognition capability can be improved, and the speed of recognition processing can be increased. It is also possible to miniaturize the speech recognition device.

If the operation for the structure of the speech recognition section 30 shown in FIG. 3 is can be realized by a single device such as a CPU, it is not always necessary to have separate components as shown in FIG. 3. For example, the temporary storage section 33 and the comparison result storage section 34 can be combined. Also, the comparison operation section 32 can receive a plurality of characteristic parameters from the vocabulary template 40 and process them in parallel. As has been described above, as the operation of the speech recognition section 30, it is possible for a characteristic parameter to be educed from the output of the speech analysis section 20, and to compare with a characteristic parameter stored in the vocabulary template 40. By carrying out this comparison processing in a reduced structure, it is possible to reduce the size of the speech recognition device.

The plurality of characteristic parameters stored in the vocabulary template 40 and the speech codes stored in the table section 60 can be stored in a single memory. In this case, if the storage positions of the characteristic parameters and the speech codes for the same sound are made to correspond to one another, it goes without saying that it can be applied to the above described embodiment.

In the above described embodiment, description has been given for a speech recognition device used in controlling the operation of respective devices within a vehicle, and in this case the desired effect is to enable safe driving. However application of the speech recognition device of the present invention is not thus limited. For example, if the speech recognition device is applied to a toy, if characteristic parameters of noises that are expected to occur in the environment in which that toy is used are previously entered in the vocabulary template, it is possible to cause the toy to operate only in response to a specific noise, and power consumption can be reduced. In this way, depending on the environment in which the speech recognition device is applied, if the characteristic parameters of sounds that are expected to occur in that environment are previously entered in the vocabulary template 40, the speech recognition device of the present invention can be applied in various situations and the recognition capability can be improved.

In the above described embodiment, a description has been given of a speech recognition method and a speech recognition device for an unspecified speaker, but the speech recognition method and a speech recognition device of the present invention can be applied for a specified speaker. In this case, similar effects to those described above can be obtained, and parameters to be stored in the vocabulary template do not need to be prepared taking into consideration unspecified speakers. This means that the vocabulary template can be reduced in size and the number of items subjected to comparison processing can be reduced, so the speech recognition device can be reduced in size and the processing speed with respect to the speech recognition method can be increased.

As has been described above, by applying the speech recognition method of the present invention, it is possible to reduce erroneous recognition for words that are not to be recognized and ambient sounds, and the recognition capability can be improved.

Further, by applying the speech recognition device of the present invention, it is possible to realize the above described effects of reducing the size of the speech recognition device, without significantly increasing the cost and without major changes to a conventional speech recognition device.

What is claimed is:

1. A speech recognition method for carrying out speech recognition for a sound that has been input, comprising the steps of:

providing a vocabulary template in which characteristic parameters for a plurality of specific sounds that are to be recognized and characteristic parameters for sounds different from the specific sounds are stored;

detecting characteristic parameters from the input sound; and obtaining degrees of similarity between the detected characteristic parameters of the input sound and respective characteristic parameters stored in said vocabulary template, and outputting information indicating one characteristic parameter among the characteristic parameters stored in the vocabulary template that approximates the detected characteristic parameters of the sound as a result, wherein one of the specific sounds is a predetermined word and one of the sounds different from the specific sounds is a word that is phonetically similar to the predetermined word.

2. The speech recognition method as claimed in claim 1, further comprising the step of outputting a speech code corresponding to said one of said specific sounds if one characteristic parameter for one of said specific sounds stored in said vocabulary template has been selected as a result of obtaining said degrees of similarity, or carrying out specific processing if outputting a speech code corresponding to said one characteristic parameter for said one of said sounds different from said specific sounds stored in said vocabulary template has been selected as a result of obtaining said degrees of similarity.

3. The speech recognition method as claimed in claim 2, wherein as said specified processing, output of a speech code corresponding to said one of said sounds different from said specific sounds is prevented.

4. The speech recognition method as claimed in claim 2, wherein as said specified processing, a specific sound code corresponding to said one of said sounds different from said specific sounds is output.

5. The speech recognition method as claimed in claim 1, wherein a characteristic parameter for one of said sounds different from the specific sounds entered in said vocabulary template is a characteristic parameter for an ambient sound.

6. The speech recognition method as claimed in claim 1, further comprising the steps of:

detecting whether or not said one characteristic parameter indicated by said information is a characteristic parameter for one of said sounds different from said specific sounds, the detecting step using a memory which stores codes corresponding to information indicating characteristic parameters for said sounds different from said specific sounds; and outputting a code corresponding to said information if said one of said characteristic parameters is detected to be a characteristic parameter for one of said specific sounds, and preventing output of said information or outputting information indicating one of said sounds different from said specific sounds if said one of said characteristic parameters is detected to be a characteristic parameter for one of said sounds different from said specific sounds.

7. The speech recognition method as claimed in claim 1, wherein the vocabulary template stores one characteristic parameter for a plurality of impact noises among said sounds different from the specific sounds, the plurality of impact noises including at least two selected from the group consisting of impact noises that are produced when a microphone is bumped, when a door is closed, when a table is hit, when hands are clapped, and when an object is dropped.

8. A speech recognition device for carrying out speech recognition, comprising:

a characteristic parameter storage circuit in which is stored characteristic parameters for a plurality of specific sounds that are to be recognized, and characteristic parameters for sounds different from the specific sounds;

a characteristic parameter educing circuit for educing characteristic parameters for an input sound;

a degree of similarity comparison circuit for obtaining degrees of similarity between the educed characteristics parameters of said input sound and respective characteristic parameters entered in said parameter storage circuit; and a comparison result outputting circuit for outputting information indicating, on the basis of the degree of similarity comparison circuit, one characteristic parameter that has been stored in said characteristic parameter storage circuit and approximates to the educed characteristic parameter of the input sound, wherein one of the specific sounds is a predetermined word and one of the sounds different from the specific sounds is a word that is phonetically similar to the predetermined word.

9. The speech recognition system as claimed in claim 8, further comprising:

a speech code table for converting to recognizable speech codes that can be recognized by an external device, in accordance with information output from said comparison result outputting circuit; and a speech code conversion circuit for detecting a preferred speech code from said speech code table based on information output from said comparison result outputting circuit, and outputting the preferred speech code.

10. The speech recognition system as claimed in claim 9, wherein said speech code conversion circuit comprises:

a detecting section for detecting a preferred speech code from said speech code table using information output from said comparison result outputting circuit; and a decision circuit for deciding whether said preferred speech code that has been detected is one of said specific sounds or a sound different from said specific sounds, and preventing output of the speech code when the result is that the sound is different from said specific sounds.

11. The speech recognition system as claimed in claim 9, wherein said speech code conversion circuit comprises:

a detecting section for detecting a preferred speech code from said speech code table using information output from said comparison result outputting circuit; and a decision circuit for deciding whether said preferred speech code that has been detected is one of said specific sounds or a sound different from said specific sounds, and outputting the speech code when the result is that the sound is different from said specific sounds.

12. The speech recognition device as claimed in claim 8, wherein a characteristic parameter for a sound different from the specific sounds stored in said characteristic parameter storage circuit is a characteristic parameter for an ambient sound.

13. The speech recognition device as claimed in claim 12, wherein one characteristic parameter is stored in said characteristic parameter storage circuit for a plurality of impact noises among said ambient sounds, the plurality of impact noises including at least two selected from the group consisting of impact noises that are produced when a microphone is bumped, when a door is closed, when a table is hit, when hands are clapped, and when an object is dropped.

14. The speech recognition device as claimed in claim 8, wherein said speech recognition device is used to control devices installed within a company.

15. The speech recognition device as claimed in claim 8, wherein characteristic parameters for the speech of a specified speaker are stored in said characteristic parameter storage circuit.

16. A speech recognition method for carrying out speech recognition for a sound that has been input, comprising the steps of:

providing a vocabulary template in which characteristic parameters for a plurality of specific sounds that are to be recognized and characteristic parameters for sounds different from the specific sounds are stored, the sounds different from the specific sounds including at least two impact noises selected from the group consisting of impact noises that are produced when a microphone is bumped, when a door is closed, when a table is hit, when hands are clapped, and when an object is dropped, and the characteristic parameters stored in the vocabulary template including a common characteristic parameter for the at least two impact noises;

detecting characteristic parameters from the input sound; and obtaining degrees of similarity between the detected characteristic parameters of the input sound and respective characteristic parameters stored in the vocabulary template, and outputting information indicating one characteristic parameter among the characteristic parameters stored in the vocabulary template that approximates the detected characteristic parameters of the sound as a result.

17. The speech recognition method as claimed in claim 16, further comprising the step of outputting a speech code corresponding to said one of said specific sounds if one characteristic parameter for one of said specific sounds stored in said vocabulary template has been selected as a result of obtaining said degrees of similarity, or carrying out specific processing if one characteristic parameter for said one of said sounds different from said specific sounds stored in said vocabulary template has been selected as a result of obtaining said degrees of similarity.

18. The speech recognition method as claimed in claim 16, further comprising the steps of:

detecting whether or not said one characteristic parameter indicated by said information is a characteristic parameter for one of said sounds different from said specific sounds, the detecting step using a memory which stores codes corresponding to information indicating characteristic parameters for said sounds different from said specific sounds; and outputting a code corresponding to said information if said one of said characteristic parameters is detected to be a characteristic parameter for one of said specific sounds, and preventing output of said information or outputting information indicating one of said sounds different from said specific sounds if said one of said characteristic parameters is detected to be a characteristic parameter for one of said sounds different from said specific sounds.

19. The speech recognition method as claimed in claim 18, wherein the memory stores a plurality of codes for said sounds different from said specific sounds.

20. The speech recognition method as claimed in claim 18, wherein the memory is a register which stores a code in common for said sounds different from said specific sounds.

* * * * *